3,681,309
NOVEL PROCESS FOR COPOLYMERIZING ETHYLENE, A $C_3$-$C_{10}$ ALPHA OLEFIN AND A 5,6-DIMETHYLENE 2-NORBORNENE

Henry S. Makowski, Scotch Plains, and Paul Borzel, Elizabeth, N.J., assignors to Esso Research and Engineering Company
No Drawing. Filed May 2, 1969, Ser. No. 821,508
Int. Cl. C08f 1/28, 5/00, 15/40
U.S. Cl. 260—80.78           13 Claims

ABSTRACT OF THE DISCLOSURE

In accordance with certain of its aspects, this invention includes a method of preparing an elastomeric copolymer of ethylene, a $C_3$ to $C_{10}$ alpha olefin, and a 5,6-dimethylene-2-norbornene characterized by high curability, high vulcanizability, high solubility in heptane, non-self-curability, high resistance to ozone attack, and containing conjugated residual unsaturation which comprises forming a monomer mixture containing ethylene as a first component, a $C_3$ to $C_{10}$ alpha olefin as a second component, and a 5,6-dimethylene-2-norbornene as a third component; polymerizing said mixture in the presence of a compound of a transition metal as catalyst and an organometal compound as cocatalyst thereby forming a terpolymer of ethylene, $C_3$ to $C_{10}$ alpha olefin, and said 5,6-dimethylene-2-norbornene wherein said terpolymer contains conjugated residual unsaturation derived from the 5,6-dimethylene moiety of said norbornene; and withdrawing said copolymer as product. The novel copolymer is further characterized by the presence of a saturated backbone polymer chain and two double bonds in conjugated relationship external to the backbone.

---

This invention relates to a process for preparing novel polymeric compositions. More specifically, it relates to a process for preparing a vulcanizable terpolymer containing a conjugated diolefin residue and to the novel product so prepared.

As is well known to those skilled-in-the-art, polymers and copolymers of alpha olefins, such as ethylene and propylene have been prepared and found to possess highly satisfactory properties for a wide variety of uses. Additional desired properties, or modification of existing properties of these copolymers, may be effected by polymerization of more than one alpha olefin, typically two alpha olefins such as ethylene and propylene, with other polymerizable materials to produce terpolymers and tetrapolymers.

It has not heretofore been satisfactorily possible to form terpolymers containing residual unsaturation in the form of conjugated double bonds derived from conjugated diolefins. This has been because inter alia it has not heretofore been possible, using the catalyst systems commonly used in alpha olefin copolymerization, to incorporate conjugated diolefins into the polymer structure in high yield. Prior attempts have been unsuccessful because it has been found that presence in the reaction system of conjugated diolefins has substantially decreased the catalyst activity.

It is an object of this invention to provide a novel process for preparing polymeric compositions. It is a further object of this invention to provide novel polymeric compositions characterized by unexpected properties. Other objects will be apparent to those skilled-in-the-art on inspection of the following description.

In accordance with certain of its aspects, the method of this invention for preparing an elastomeric copolymer of ethylene, a $C_3$ to $C_{10}$ alpha olefin, and a 5,6-dimethylene-2-norbornene characterized by high curability, high vulcanizability, high solubility in heptane, non-self-curability, high resistance to ozone attack, and containing conjugated residual unsaturation may comprise forming a monomer mixture containing ethylene as a first component, a $C_3$ to $C_{10}$ alpha olefin as a second component, and a 5,6-dimethylene-2-norbornene as a third component; polymerizating said mixture in the presence of a compound of a transition metal as catalyst and an organometal compound as cocatalyst thereby forming copolymer of ethylene, $C_3$ to $C_{10}$ alpha olefin, and 5,6-dimethylene-2-norbornene wherein said terpolymer contains conjugated residual unsaturation derived from the 5,6-dimethylene moiety of said norbornene; and withdrawing said copolymer as product.

The ethylene used in practice of this invention may typically be purified commercially available ethylene of greater than 99.98% purity, typically 99.98%–99.999%, say 99.99%. It may contain less than 0.02%, typically 0.001%–0.02%, say 0.01% non-olefinic impurities, and less than 0.001%, say 0.0001%–0.0005% water.

The alpha olefin, also called a terminal olefin, which may be used in practice of this invention may be a purified commercially available $C_3$ to $C_{10}$ olefin having a purity of greater than 99.98%, typically 99.98%–99.999%, say 99.99%. It may contain less than 0.02%, say 0.001%–0.02%, say 0.01% non-olefinic impurities and less than 0.001%, say 0.0001%–0.0005% water.

Non-polar impurities, such as ethane or other hydrocarbons may be present, but for best results, polar compounds such as oxygen, water, carbon dioxide, carbon monoxide may be maintained at the indicated low levels in the ethylene and alpha olefin feeds.

The alpha olefins having three to ten carbon atoms, may be designated by the formula $R'—CH=CH_2$ wherein $R'$ is hydrocarbon and typically selected from the group consisting of alkyl, alkaryl, aralkyl, and aryl. Most preferably $R'$ may be a fully saturated alkyl including cycloalkyl. Alpha olefins may include typically:

TABLE I

| | |
|---|---|
| propene | 3-ethyl pentene-1 |
| butene-1 | octene-1 |
| pentene-1 | 3-methyl heptene-1 |
| 3-methyl butene-1 | 4-methyl heptene-1 |
| hexene-1 | 5-methyl heptene-1 |
| 3-methyl pentene-1 | 6-methyl heptene-1 |
| 4-methyl pentene-1 | 3-ethyl hexene-1 |
| heptene-1 | 4-ethyl hexene-1 |
| 3-methyl hexene-1 | 3-propyl hexene-1 |
| 4-methyl hexene-1 | decene-1 |
| 5-methyl hexene-1 | |

The preferred alpha olefin may be propylene, i.e. propene.

The 5,6-dimethylene-2-norbornene which may be used in practice of this invention may include those inertly substituted compounds having the Formula I wherein the carbon atoms are designated by number for easy reference.

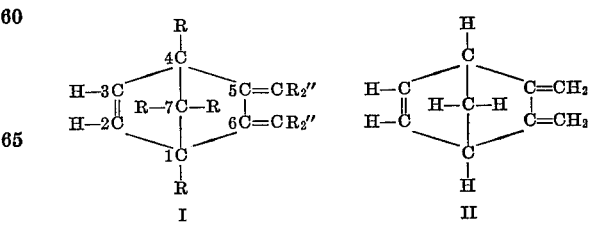

In the Formula I, each of the R and R'' groups may be hydrogen or hydrocarbon and preferably independently selected from the group consisting of hydrogen, alkyl, alkaryl, aralkyl, and aryl. When R or R'' is alkyl, it may be methyl, ethyl, propyl, isopropyl, butyl, hexyl, octyl, decyl, etc. When R or R'' is alkaryl, it may be tolyl, xylyl, etc. When R or R'' is aralkyl, it may be benzyl, etc. When R or R'' is aryl, it may be phenyl, naphthyl, etc. The preferred R and R'' groups may be alkyl and aryl having up to 12 carbon atoms.

In the preferred embodiment, the R groups may be hydrogen. In the most preferred embodiment, R and R'' are hydrogen, and the composition is 5,6-dimethylene-2-norbornene se (II).

Typical 5,6 - dimethylene - 2 - norbornene compounds which may be employed may include:

TABLE II 5,6-dimethylene-2-norbornene se
1-methyl-5,6-dimethylene-2-norbornene
1-ethyl-5,6-dimethylene-2-norbornene
1-butyl-5,6-dimethylene-2-norbornene
7-methyl-5,6-dimethylene-2-nonbornene
7-butyl-5,6-dimethylene-2-norbornene
1-cyclohexyl-5,6-dimethylene-2-norbornene
7-methyl-5,6-dimethylene-2-norbornene
7-propyl-5,6-dimethylene-2-norbornene
7-ethyl-5,6-dimethylene-2-norbornene
1-phenyl-5,6-dimethylene-2-norbornene These materials may be readily available or they may be prepared by procedures well known to those skilled-in-the-art.

Formation of the novel copolymers of this invention may be effected by forming a mixture of the three components containing the following molar parts:

TABLE III

| Component | Broad range | Preferred range | Preferred |
|---|---|---|---|
| Ethylene | 1,000–2,500 | 1,250–1,900 | 1,700 |
| Alpha olefin | 1,600–7,500 | 2,000–3,300 | 2,500 |
| 5,6-dimethylene 2-norbornene | 15–200 | 25–40 | 30 |

Mixtures of these compounds may be used, i.e. more than one alpha olefin and/or more than one 5,6-dimethylene-2-norbornene may be employed. Other compatible components, including those which are copolymerizable to form tetrapolymers may be present including e.g. aromatic mono-olefins such as styrene, etc.

The following may be representative of copolymers which may be prepared by the process of this invention:

ethylene/propylene/5,6-dimethylene-2-norbornene;
ethylene/propylene/1-methyl-5,6-dimethylene-2-norbornene;
ethylene/propylene/1-ethyl-5,6-dimethylene-2-norbornene;
ethylene/1-butene/5,6-dimethylene-2-norbornene;
ethylene/1-hexene/5,6-dimethylene-2-norbornene;
ethylene/4-methyl-1-hexene/7-methyl-5,6-dimethylene-2-norbornene;
ethylene/1-decene/1-cyclohexyl-5,6-dimethylene-2-norbornene.

The mixture may be polymerized (either batchwise or continuously) to form the desired polymer in the presence of a Ziegler-type catalyst. A Ziegler-type catalyst may typically include:

(a) A compound, preferably a halide, of a transition metal, i.e. a metal of Groups I–B through VII–B and VIII of the Periodic Table and having an atomic number falling within the range of 21–30, 39–48, 57–80, and 80–130. The first category including metals starting with scandium (21) and ending with zinc (30) may be preferred; and titanium (22) may be most preferred. The halide may be a fluoride, chloride, bromide, or iodide, preferably chloride. The preferred compound may be titanium tetrachloride or vanadium tetrachloride.

(b) An organometal compound (of a metal of Groups I–A, II–A, II–B, and III–A), preferably an organo-aluminum compound $R'''_nAlX_{3-n}$ wherein $R'''$ may be selected from the same group as that from which R and R'' supra are selected, X is a halogen, and $n$ is an integer 1–3. An organometal compound is one characterized by the presence of at least one carbon-to-metal bond. Typical compounds may be $R'''_2Zn$, $R'''_3Al$, $R'''_2AlX$, and $R'''AlX_2$; and the preferred compound may be diethyl aluminum chloride or tri-isobutyl aluminum.

The preferred catalyst mixture may include 0.3–1.5 moles, say 0.7 mole of transition metal halide and 2.5–10 moles, say 5.0 mole of organoaluminum compound.

Polymerization may preferably be effected by passing 1250–190 moles, say 170 moles of ethylene and 2000–3300 moles, say 2500 moles of alpha-olefin, either separately or as a mixture, into a liquid reaction medium containing 25–40 parts, say 30 parts of the norbornene reactant. The non-reactive reaction-medium solvent may preferably be an aromatic hydrocarbon such as toluene, a saturated aliphatic hydrocarbon such as heptane, or a halohydrocarbon such as tetrachloroethylene. Reaction may preferably be under substantially anhydrous and anaerobic conditions. Water and oxygen must be excluded from the system to obtain maximum yield; and the reactants may be pre-treated to insure that they are oxygen-free and dry.

During polymerization, the reaction mixture may be agitated and maintained at temperatures of $-30°$ C. to $+30°$ C., say $10°$ C. and pressure of 0–150 p.s.i.g., say 15 p.s.i.g. (i.e. 0–10 kg./cm.$^2$, say 1 kg./cm.$^2$) during a period of 5–50 minutes, say 20 minutes.

At the end of this period, polymerization may be found to be complete. The catalyst may be deactivated as by addition of a low molecular weight alcohol such as butanol, and the reaction mixture contacted with dilute acid, such as hydrochloric acid and water washed. The organic layer may be dried and then stripped of reaction-medium solvent to yield a residue of elastomeric terpolymer.

The terpolymer may be obtained in amounts of 30–100 parts, say 65 parts, corresponding to 85%–90%, say 88% yield (based upon ethylene). The terpolymer product may be found to typically contain ethylene monomer units concentration ranges of 45 mole percent–85 mole percent, say 65 mole percent, alpha-olefin monomer concentration ranges of 10 mole percent–60 mole percent, say 35 mole percent, and norbornene monomer unit concentration ranges of 0.5 mole percent–10.0 mole percent, say 1 mole percent. It may have a number average molecular weight typically of 30,000–200,000, say 80,000 as measured by mebrane osmometry. Typically the product may have an iodine number of 4–25, say 10. The inherent viscosity in Decalin at $135°$ C. may be 1.0–6.0, say 2.5.

In accordance with certain of its aspects, the novel copolymer of this invention, which is sulfur-curable to an elastomeric vulcanizate, may thus be a terpolymer of ethylene as a first component, a $C_3$ to $C_{10}$ alpha-olefin as a second component, and a 5,6-dimethylene-2-norbornene as a third component; said copolymer having a substantially saturated backbone polymer chain and two double bonds in conjugated relationship external to the backbone chain.

The terpolymers as obtained may be soluble in heptane. They are non-self-curing but may be readily cured with all known curing agents including the conventional sulfur accelerator systems, radical-generating agents such as peroxides, quinoid-curing systems, resin cures, i.e. via halogenated condensation products of phenol and formaldehyde, and uniquely the bisdienophiles according to the Diels-Alder reaction.

It is particularly unexpected that this novel polymer is attainable. Terpolymerization in the presence of a conjugated diolefinic moiety has heretofore been difficult-to-impossible without severe process disadvantages because the high activity of such moieties has reduced catalyst efficiency (to below 30% of the activity normally noted) and decreased production of the desired terpolymer. Furthermore, the activity of the conjugated system has been such that it was destroyed during reaction to produce a product which was essentialy free of conjugation.

It is particularly unexpected that the novel terpolymers of this invention can be readily prepared in high yield as determined by catalyst efficiency. They are characterized by high molecular weight, by desirable ethylene monomer unit content of 50%–80% which contributes good elastomeric properties, and by a desirably high propylene conversion of up to 30%.

These terpolymers are extraordinarily resistant to ozone attack. Although they may be non-self-vulcanizable, they may readily be vulcanized or cured quickly by a variety of agents. When so cured, their resistance to ozone attack may be outstanding. Typical cured terpolymers may show no evidence of deterioration after exposure to 100 p.p.m. ozone at 100° F. (38° S.) for 824 hours.

It is an outstanding feature of the ethylene, alpha-olefin, 5,6-dimethylene-2-norbornene terpolymers of this invention that, because they possess a saturated backbone polymer chain and two double bonds in conjugated relationship external to the backbone chain, they may be cured by reaction with a bis-dienophile. A bis-dienophile may be a bifunctional moiety having an activated double or triple bond which will enter into a Diels-Alder 1,4-cyclo-addition. Typical bis-dienophiles may include metaphenylene bis maleimide, quinone, etc.

The terpolymers of this invention may be blended with a wide variety of compounding agents during curing. Typical of such agents may be carbon black which increases the tensile strength, titanium dioxide, silica, etc.

The polymers may be used for a wide variety of end uses. They may find use in molded, formed, or coated products including sponges, tires and inner tubes, footwear, cable coatings, wire coatings, hoses and tubing, belts, etc.

The desirable properties present in the product are contributed in substantial measure by the presence of the conjugated olefin residue derived from the norbornene compound.

Practice of this invention may be illustrated by the following examples wherein all parts are parts by weight unless otherwise indicated.

EXAMPLE 1

In accordance with this invention, there may be admitted to a reaction vessel maintained at a pressure of 0 p.s.i.g. (0 kg./cm.$^2$) and 20° C., the following:

(a) 40 l./hr. prepurified ethylene gas;
(b) 60 l./hr. prepurified propylene gas;
(c) 3.5 l./hr. of solvent heptane which is saturated with ethylene and propylene in the reaction vessel under the conditions of reaction;
(d) 25 millimoles/hr. of 5,6-dimethylene-2-norbornene;
(e) 0.5 millimoles/hr. of vanadium tetrachloride $VCl_4$ catalyst; and
(f) 2.5 millimoles/hr. of diethyl aluminum chloride, $(C_2H_5)_2AlCl$ catalyst.

The reaction mixture may be continually agitated during the reaction which occurs over an effective period of 180 minutes.

The product polymer, which may be continuously withdrawn from the bottom of the reactor as a 3% cement, may be treated in heptane solution with 0.01 l./hr. of methanol. Polymer may be recovered by stream stripping the solution to remove heptane; and the polymer may be stabilized with a thio-bisphenol or other inhibitor.

Yield may be 800 grams of product polymer per gram of vanadium tetrachloride catalyst. The terpolymer may contain 57.5% ethylene; and may be characterized by a strong absorption at 11.37 microns in the infrared spectrum.

EXAMPLE 2

In accordance with this invention, the procedure of Example 1 was carried out except that the catalyst was:

(a) 0.3 millimoles/hr. of vanadium tris acetylacetonate $V(CH_3COCHCOCH_3)_3$, i.e., V(Acac); and
(b) 3.6 millimoles/hr. of diethyl aluminum chloride: $(C_2H_5)_2AlCl$.

Yield (i.e., catalyst efficiency) may be 350 grams of product polymer per gram of vanadium tris acetylacetonate; and the product may have an ethylene content of 75%.

EXAMPLES 3–6

In this series of examples, Example 3 is a control example to indicate the catalyst efficiency and the propylene conversion in an ethylene-propylene copolymer system. In Example 3, 1600 mmoles/hr. of ethylene and 3000 mmoles/hr. of propylene may be passed into a reaction system together with 3.5 liters/hr. of heptane reaction medium. There may also be charged to the system 0.5 mmoles/hr. of vanadium tetrachloride catalyst and 3.0 mmoles/hr. of diethyl aluminum chloride cocatalyst. The system may be maintained anaerobic and anhydrous at 20° C. and at autogenous pressure with agitation.

Product polymer may be withdrawn, and treated with 1000 mmoles/hr. of i-propanol deacticant, stripped of heptane, and analyzed.

In control Example 4, the reaction conditions may be maintained as in Example 3 except that the temperature may be 27° C. and the charge to the system may include 45 mmoles/hr. of isoprene as a third monomer.

In experimental Example 5, the reaction conditions may be maintained as in Example 3 except that the charge to the system may include 25.0 mmoles/hr. of 5,6-dimethylene-2- norbornene as a third monomer. In control Example 6, the reaction conditions were the same as Example 3, except that the third monomer was 30 mmoles/hr. of 5-methylene-2-norbornene.

The product of each of Examples 3–6 was analyzed for Mooney viscosity at 260° F. (130° C.), for ethylene percent content, for catalyst efficiency (grams/gram), and for propylene conversion (percent) was follows:

| Example | Mooney viscosity | $C_2^=$ | Catalyst efficiency | $C_3$ conversion |
| --- | --- | --- | --- | --- |
| 3 | 24 | 44.9 | 950 | 36 |
| 4 | 15 | 63.2 | 245 | <10 |
| 5 | >120 | 55.8 | 840 | 15 |
| 6 | 51 | 48.0 | 880 | 31 |

From this table, it will be apparent that the presence of the novel third monomer (Examples 5 and 6) unexpectedly permits attainment of terpolymer characterized by an outstandingly high catalyst efficiency which is almost equivalent to that of control Example 3. Presence of the conjugated system (Examples 5 and 6) of the 5,6-dimethylene-2-norbornene would be expected to decrease catalyst efficiency to 20%–25% of that of Example 3, which does not include a third monomer. Control Example 4, containing a conjugated system (isoprene), demonstrates that the catalyst efficiency is decreased to 245 grams/gram. Attainment in Example 5 of a catalyst efficiency of 840 grams/gram is thus unexpectedly 3–4 times as high as one might expect from knowledge of the results of Example 4.

The presence of the conjugated system in addition to the endocyclic double bond makes it unexpected that one should be able to recover the terpolymer with the conjugation intact, the polymer being soluble and non-crosslinked.

It is particularly unexpected that the system of Example 6, containing a conjugated pair of double bonds, should give such high molecular weights and catalyst efficiency in comparison to those of Example 4. Presence of the conjugated system would make one skilled in the art believe that low molecular weight and low catalyst efficiency would be achieved as in Example 4. It is also particularly unexpected that the monomer conversions are considerably superior to that of the control Example 4 using conjugated double bonds.

EXAMPLES 7–12

In these examples, run at 20/° C., the catalysts employed and the feed rates were:

| Example | Catalyst | Catalyst conc., mmole/V/l. | Al/V | $C_2^=/C_2^=$ feed rate, vol. percent | DMNB feed, mmole/hr. |
|---|---|---|---|---|---|
| 7 | Ov(Acac)$_2$Cl, DEAC | 0.138 | 10.4 | 30–70 | 22.5 |
| 8 | V(Acac)$_3$, DEAC | 0.092 | 10.8 | 40–60 | 27.4 |
| 9 | VCl$_4$, DEAC | 0.147 | 5.0 | 40–60 | |
| 10 | VCl$_4$, DEAC | 0.140 | 5.0 | 40–60 | 25.0 |
| 11 | OVCl$_3$, DEAC plus TIBA | 0.218 | 7.5 | 36–64 | |
| 12 | do | 0.218 | 7.5 | 36–64 | 25.0 |

In the above table, the designated catalysts and cocatalysts include:

(a) OV(Acac)$_2$Cl—vanadyl chloride di-acetylacetonate;
(b) V(Acac)$_3$—vanadium tris-acetylacetonate;
(c) VCl$_4$—vanadium tetrachloride;
(d) OVCl$_3$—canadyl trichloride;
(e) DEAC—diethyl aluminum chloride; and
(f) TIBA—tri-isobutyl aluminum.

The catalyst concentration is in millimoles per liter. The ratio Al/V is the mole ratio of aluminum compound to vanadium compound in the catalyst. The feed rate indicates the volume percent of ethylene and propylene in the charge which is being admitted at 4000 mmoles/hr. DMNB is 5,6-dimethylene-2-norbornene feed. All runs were performed in the presence of heptane at autogenous pressure. The product was worked up as in Example 1.

The Mooney viscosity was determined at 260° F. (130° C.). The composition of the product (weight percent) was determined by infrared absorbencies. The catalyst efficiency in terms of grams of polymer produced per gram of catalyst and the conversion of monomer were calculated.

| | | Content | | Catalyst efficiency | Monomer conversion | | |
|---|---|---|---|---|---|---|---|
| | Viscosity | $C_2^=$ | DMNB | | $C_2^=$ | $C_3^=$ | DMNB |
| Example: | | | | | | | |
| 7 | 62.9 | 6.29 | 2.95 | 330 | 71 | 10 | 48 |
| 8 | 88.5 | 75.5 | 3.1 | 320 | 51 | 6 | 34 |
| 9 | 37 | 55.6 | | 980 | | 19 | |
| 10 | 160 | 55.8 | 2.1 | 840 | 88 | 15 | 57 |
| 11 | 42 | 49.0 | | 610 | 85 | 23 | |
| 12 | | 59.0 | 2.65 | 460 | 79 | 14 | 55 |

From Examples 7, 8, 10 and 12, it may be observed that use of different illustrative catalyst systems may give yields of product characterized by satisfactory catalyst efficiency under conditions which yield high ethylene and propylene monomer conversion into finished polymers with high 5,6-dimethylene-2-norbornene incorporation in the polymer. Control Examples 9 and 11 demonstrate the production of ethylene-propylene polymer. Each of experimental Example 10 (cf. control Example 9) and Example 12 (cf. control Example 11) is identical to its control except that the experimental examples demonstrate production of the terpolymer including 5,6-dimethylene-2-norbornene, while the controls demonstrate production of the ethylene-propyleen copolymer.

Comparison of Example 10 with control Example 9 shows that it is possible to prepare terpolymers containing 5,6-dimethylene-2-norbornene of high molecular weight (i.e., Mooney viscosity), of ethylene content in the desired range to produce an elastomeric product, and of desirable monomer conversion. This can be effected with satisfactory catalyst efficiency which is not decreased as would be expected because of the presence of the conjugated moiety of the norbornene.

In a similar manner, Example 12 demonstrates attainment of a desired terpolymer in a manner similar to that of control Example 11.

EXAMPLES 13–15

The terpolymer of Example 5 may be compounded on a cool rubber mill as hereinafter set forth and then cured for 15 minutes at 320° F. (160° C.). The tensile properties of the resultant vulcanizates are shown infra. All parts are parts by weight unless otherwise indicated.

| Example | 13 | 14 | 15 | 16 | 17 | 18 |
|---|---|---|---|---|---|---|
| Component: | | | | | | |
| Polymer | 100 | 100 | 100 | 100 | 100 | 100 |
| Semi-reinforcing furnace black | 60 | 60 | 60 | 60 | 60 | 60 |
| Zinc oxide | 5 | 5 | 5 | 5 | 5 | 5 |
| Stearic acid | 1 | 1 | 1 | 1 | 1 | 1 |
| Meta-phenylene-bis-maleimide | | 1 | | | | |
| Sulfur | | | 1.5 | | | |
| Tetramethyl thiuram disulfide | | | 1.5 | | | |
| Mercaptobenzothiazole | | | 0.5 | | | |
| Dicumyl peroxide, 40% on CaCO$_3$ | | | | 1 | | |
| Brominated phenol-formaldehyde resins | | | | | 12 | |
| Dinitrosobenzene | | | | | | 4 |
| Tensile strength, p.s.i.g | 700 | 2,530 | 2,135 | 2,030 | 1,645 | 1,900 |
| Elongation, percent | 85 | 150 | 230 | 100 | 190 | 150 |

From Example 13, it may be noted that the terpolymer is not self-curing, i.e., it does not cure in the absence of curatives in Example 13. Example 14 demonstrates that metaphenylene-bis-maleimide produces a strong vulcanizate. The ability of this agent to cure the terpolymer is derived solely from the conjugated nature of the residual unsaturation.

It is noted from Example 15 that the terpolymer may be cured with a sulfur-accelerator system. This is totally unexpected since the terpolymer contains no reactive allylic hydrogens (the bridgehead hydrogens are essentially inert); and current theories of rubber vulcanization require the presence of reactive allylic hydrogen. Examples 15–18 demonstrate curing using other agents.

Having now thus fully described and illustrated the present invention, what is desired to be secured by Letters Patent is—

We claim:

1. A method for preparing an elastomeric copolymer of ethylene, a $C_3$ to $C_{10}$ alpha olefin, and a 5,6-dimethylene-2-norbornene, containing in the polymerized 5,6-dimethylene-2-norbornene moieties residual conjugated unsaturation external to the backbone chain, comprising:

(1) forming a monomer mixture containing from 1000 to 2500 molar parts of ethylene, from 1600 to 7500 molar parts of a $C_3$–$C_{10}$ alpha olefin and from 15 to 200 molar parts of a 5,6-dimethylene-2-norbornene having the general formula

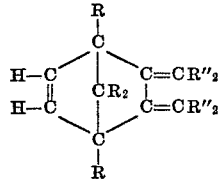

where each of R and R'' are selected from the group consisting of hydrogen, alkyl, alkaryl, aralkyl, and aryl;

(2) polymerizing said mixture in the presence of a catalyst system comprising:
(a) from 0.3 to 1.5 moles of a titanium or vanadium catalyst component selected from the group consisting of $TiCl_4$, $VCl_4$, $VOCl_3$, vanadium tris-acetylacetonate, or vanadyl chloride di-acetylacetonate; and
(b) from 2.5 to 10 moles of an organometal compound having the formula

where R''' may be an alkyl, alkaryl, aralkyl or aryl hydrocarbon, X may be Cl, Br or I, and $n$ is an integer from 1 to 3, thereby forming said copolymer of ethylene, $C_3$ to $C_{10}$ alpha olefin and said 5,6-dimethylene-2-norbornene containing conjugated residual unsaturation external to the backbone chain, derived from the 5,6-dimethylene moiety of said norbornene;

(3) and withdrawing said terpolymer as product.

2. The method of claim 1, wherein said $C_3$ to $C_{10}$ alpha olefin is propylene.

3. The method of claim 1, wherein said 5,6-dimethylene-2-norbornene is 5,6-dimethylene-2-norbornene se.

4. The method of claim 1, wherein the catalyst system consists of:
(a) from 0.3 to 1.5 moles of a titanium or vanadium catalyst component selected from the group consisting of $TiCl_4$, $VCl_4$, $VOCl_3$, $V(Acac)_3$ or $VOCl(Acac)_2$; and
(b) from 2.5 to 10 moles of an organometal compound having the formula

where R''' is an alkyl hydrocarbon and $n$ is an integer from 1 to 3.

5. The method of claim 4, wherein the catalyst system consists of $VCl_4$ and diethyl aluminum chloride.

6. The method of claim 4, wherein the catalyst system consists of $VOCl_3$ and aluminum tri-isobutyl.

7. An elastomeric copolymer comprising from 45 to 85 mole percent ethylene, from 0.5 to 10.0 mole percent of a 5,6-dimethylene-2-norbornene, and the remainder being a $C_3$ to $C_{10}$ alpha olefin, the 5,6-dimethylene-2-norbornene having the general formula

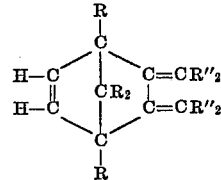

where each of R and R'' are selected from the group consisting of hydrogen, alkyl, alkaryl, aralkyl, and aryl; said copolymer having a substantially saturated backbone polymer chain and two double bonds in conjugated relationship external to the backbone chain.

8. The copolymer of claim 7, wherein said third component is 5,6-dimethylene-2-norbornene se.

9. The copolymer of claim 7, wherein there is combined ethylene, propylene and 5,6-dimethylene-2-norbornene se.

10. The copolymer of claim 7, which is characterized by having a number average molecular weight of 30,000 to 200,000; an iodine number of from 4 to 25; and an inherent viscosity in decalin at 135° C. of from 1.0 to 6.0.

11. A method for curing the elastomeric copolymer of claim 7, which comprises mixing said copolymer with metaphenylene-bis-maleimide, heating said mixture a sufficient time to cause reaction of said metal phenylene-bis-maleimide with said copolymer, and withdrawing said cured elastomer.

12. A method for curing the elastomeric copolymer of claim 7, which comprises mixing said copolymer with quinone, heating said mixture a sufficient time to cause reaction of said quinone with said copolymer, and withdrawing said cured elastomer.

13. The cured elastomer of claim 11.

References Cited
UNITED STATES PATENTS

| | | | |
|---|---|---|---|
| 3,093,621 | 6/1963 | Gladding | 260—80.5 |
| 3,162,620 | 12/1964 | Gladding | 260—80.5 |
| 3,222,333 | 12/1965 | Duck et al. | 260—80.68 |
| 3,386,975 | 6/1968 | Marconi et al. | 260—80.78 |

JOSEPH L. SCHOFER, Primary Examiner

R. A. GAITHER, Assistant Examiner